United States Patent Office 3,169,256
Patented Feb. 16, 1965

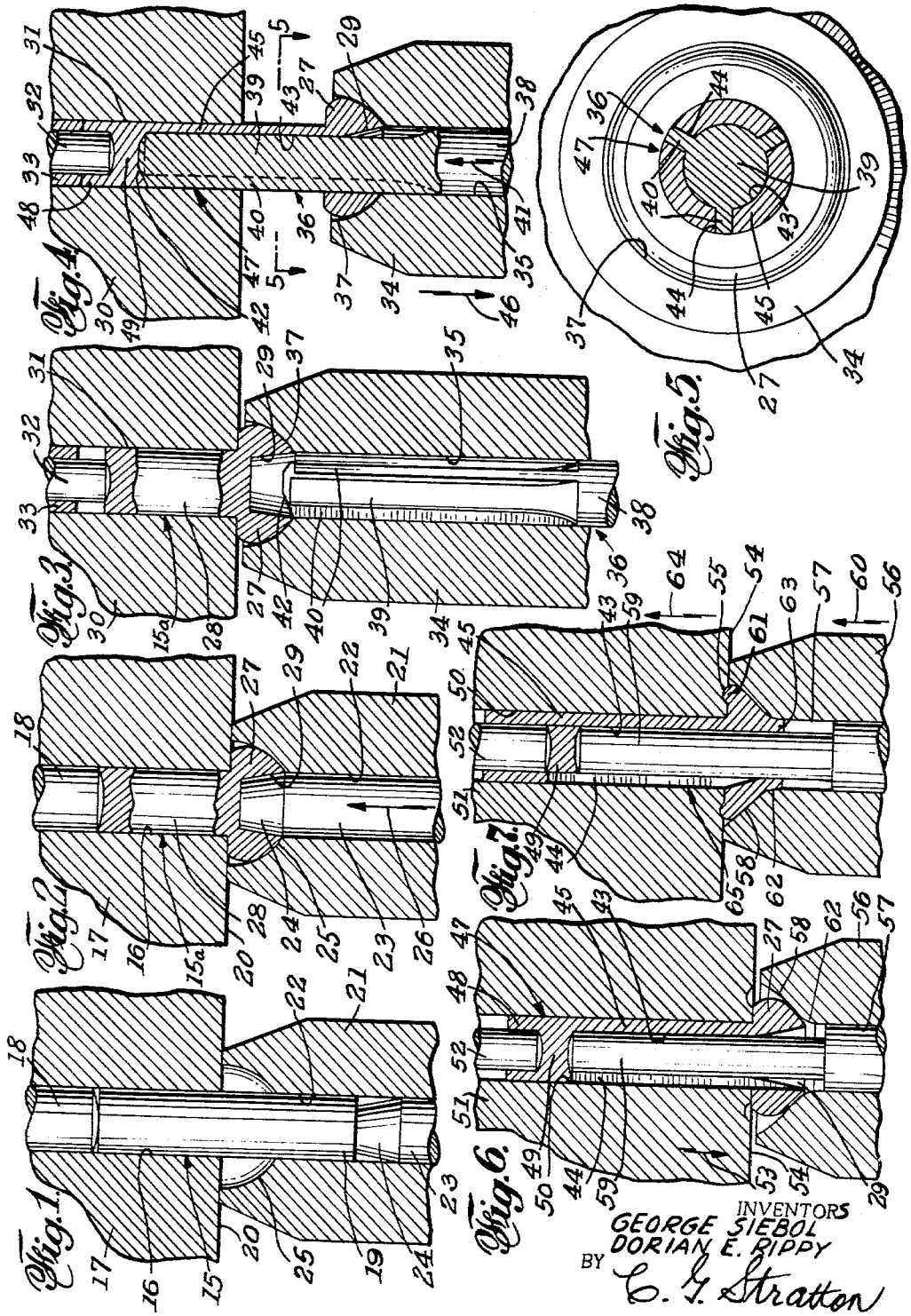

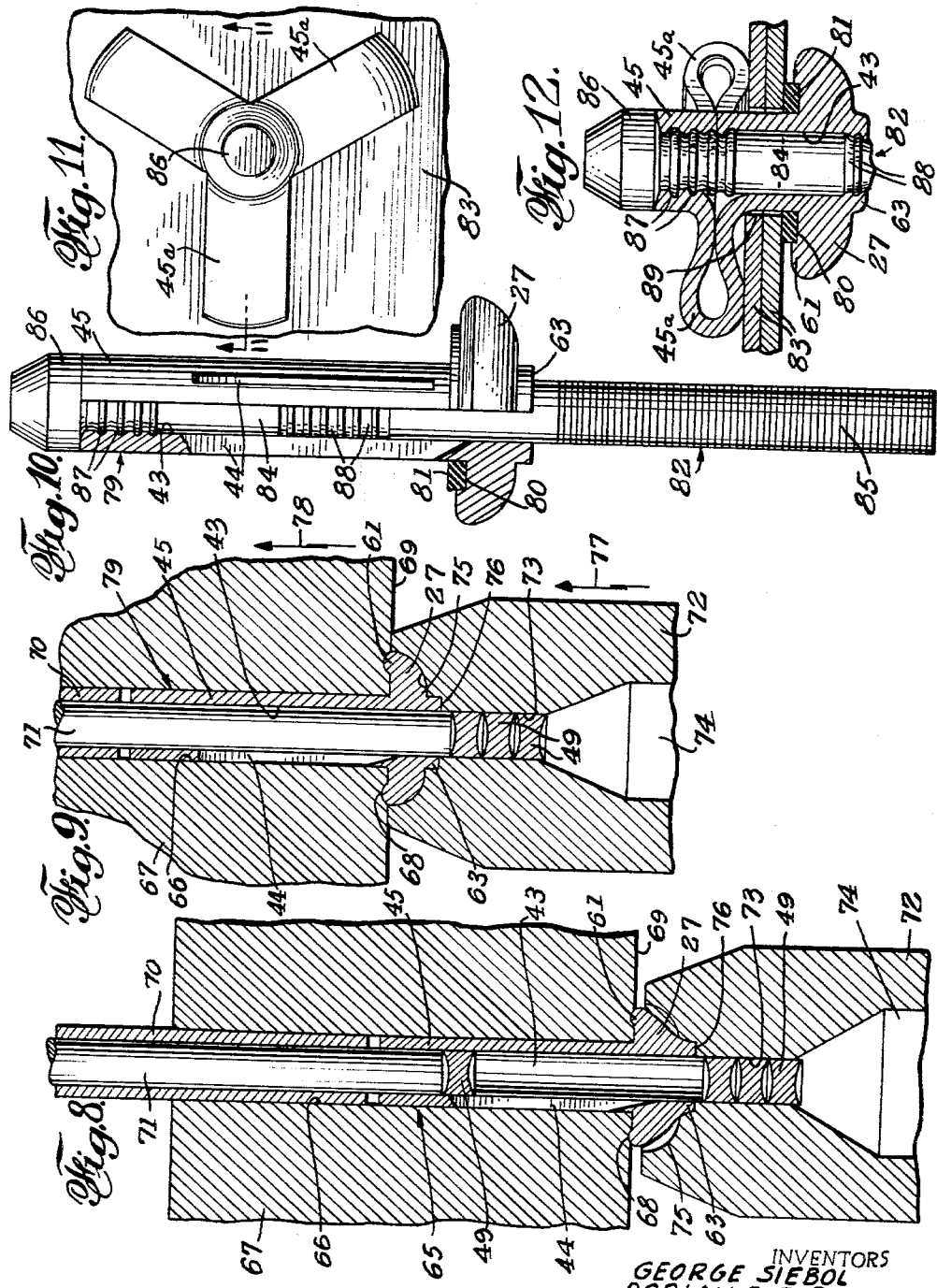

3,169,256
METHOD OF FORMING SLEEVE FOR LOCK RIVET
George Siebol and Dorian E. Rippy, Garden Grove, Calif.,
assignors to Olympic Screw & Rivet Corporation,
Downey, Calif., a corporation of California
Filed Mar. 11, 1963, Ser. No. 264,363
10 Claims. (Cl. 10—27)

This invention relates to a sleeve for lock rivets and to a method for producing the same.

An object of the present invention is to provide a method for producing the sleeves of lock rivets from solid wire or rod stock, such stock being less costly, by weight, than other forms of stock.

Another object of the invention is to provide a method of the character referred to that is carried out without loss of metal, all of the stock blank that is used being retained in the finished sleeve.

A further object of the invention is to provide a method as characterized, that may be advantageously carried out in a rapid, clean and accurate manner in four-station progressive headers of generally conventional design, the operation being such that no chips or cuttings are produced and the speed of operation is increased because forging and extrusion steps are employed rather than cutting or grinding steps.

A still further object of the invention is to provide a sleeve-producing method that provides for uniformity of production and minimum wear on dies, hammers and other elements comprising the tooling for carrying out the present method.

This invention also has for its object to provide a novel, economical and convenient method or process of superior utility.

The invention also comprises novel combinations of method steps, which will appear more fully in the course of the following description of the present method or process, the same being based on the accompanying drawings. However, the following specification merely discloses one embodiment of the present invention, and the same is given by way of example only.

In the drawings, like reference characters designate similar parts in the several views.

FIG. 1 is a longitudinal sectional view of die means for pre-heading a piece of stock and shown at the beginning of the pre-heading operation.

FIG. 2 is a similar view showing said die means at the end of the pre-heading operation.

FIG. 3 is a longitudinal sectional view of die means for extruding the stock piece to its finished length and simultaneously forming slots therein and shown at the beginning of this compound operation step of the method.

FIG. 4 is a similar view showing said die means at the end of the extruding and slot-forming operation.

FIG. 5 is an enlarged cross-sectional view as taken on the line 5—5 of FIG. 4.

FIG. 6 is a longitudinal sectional view of die means for simultaneously shearing a passage-blocking portion of the stock piece as formed by the die means of FIGS. 3 and 4, and further pre-heading the same and shown at the beginning of said compound operation step of the method.

FIG. 7 is a similar view showing the latter die means at the end of the shearing and head-pre-forming operation.

FIG. 8 is a longitudinal sectional view of die means for final-forming of the sleeve and removal of the portion sheared by the die means of FIGS. 6 and 7, and shown at the beginning of said compound operation step of the method.

FIG. 9 is a similar view showing the latter die means at the end of the finish-forming and portion-removing operation.

FIG. 10 is an enlarged view, in quarter section, of a lock rivet provided with a sleeve as formed by the die means illustrated in FIGS. 1 to 9.

FIG. 11 is a plan view of said rivet after the same has been clinched to rivet together two or more members.

FIG. 12 is a longitudinal sectional view of the rivet, as in FIG. 11.

The present sleeve-forming method is carried out as a four-step method that is advantageously carried out in a machine known to the trade as a four-station progressive header. The four steps are: pre-heading of the stock blank, simultaneous extrusion to final length and formation of slits in the resulting tubular wall of the pre-formed blank, simultaneous shearing of a passage-blocking portion and further pre-heading of the pre-formed blank, and simultaneous removal of the sheared portion and final-forming of the head on the sleeve.

Pre-heading

With particular reference to FIGS. 1 and 2, a cylindrical blank 15 of a malleable metal, such as aluminum or an alloy thereof, is positioned in the bore 16 of a die block 17, a fixed back-up pin 18 in said bore limiting the position of the blank so one end 19 thereof extends from the face 20 of the die block.

An upset punch 21 is operatively disposed in opposition to the die block 17 with its axial bore 22 aligned with the bore 16 of the die block. An upset pin 23 moves longitudinally in the bore 22, a frusto-conical or tapered end 24 on said pin 23 being directed to engage against the end 19 of the blank 15. The end of the punch 21 is provided with a semi-spherical seat 25.

With the punch 21 separated from the die block 17, a blank 15 is placed either in the bore 16 or the bore 22. Then the punch is moved toward the die to first bring about the condition of FIG. 1 wherein the punch is engaged with the die block face 20. Then, as the upset pin 23 is moved in the direction of the arrow 26, the tapered end 24 of said pin simultaneously seats itself in the end 19 of the blank and displaces said end from the bore 22 so the same may spread in the seat 25 in the form of a bulbous, partly-formed head 27. Since the back-up pin is fixed, the remainder of the blank remains as a shank 28 having the original diametral size of the blank 15. It will be noted that the end 24 of the upset pin forms a frusto-conical seat 29 in the pre-formed head 28. The first operation step is completed and the pre-headed blank 15a is removed from the die block 17 upon separation of the punch 21 from said block.

Extrusion and slit-formation

This step of the method is carried out by the means shown in FIGS. 3, 4 and 5, wherein a die block 30, which has a bore 31 in which the shank 28 of the pre-formed blank 15a is received, is provided with a fixed back-up pin 32 that is engaged with the end of said shank, and a knock-out sleeve 33 around said pin is longitudinally movable in the bore 31.

A holder block 34 has a bore 35 that is axially aligned with the bore 31 of the die block, an extrusion tool 36 being operatively movable in said bore 35. The end of the holder block 34, that is directed toward the die block 30, is provided with a seat 37 to accommodate the pre-formed head 27.

The tool 36 is shown as a shank 38 from which extends a passage-forming cylindrical body 39 of lesser diameter than the shank, and a plurality of longitudinal lands 40 (in this case, three) preferably uniformly spaced around the surface of said body 39. The diametral dimension over the outside of the lands is substantially equal to the diametral size of the shank 28 of the pre-formed blank 15a. For practical purposes, the tool shank 38 has the same diametral size.

After the pre-formed blank 15a has been placed in the bore 31 of the die block 30 with the pre-formed head 27 extending from the end of said block, the holder block 34 is moved axially into engagement with said head 27, said block 34 being held resiliently in this position so as to be capable of retracting away from the die block under forces generated during extrusion. FIG. 3 shows this condition and the position of the tool 36 with respect to the blank 15a immediately before the same is projected, according to the arrow 41.

Upon such projection of the tool 36, the end 42 thereof will first enter the seat 29 of the pre-formed head 27 and then will force its way longitudinally into the shank 28 so the tool body 39, due to the malleability of the pre-formed blank, forms a cylindrical passage 43 and the lands 40 form slits 44 in said shank, as best seen in FIG. 5, wherein it will be seen that the slits 44 divide the now tubular shank 45 into arcuately sectioned portions.

It will be realized that the solid shank 28, because of the displacement of metal, by extrusion, as above, results in elongation to the length of shank 45 without loss of metal, as in FIG. 4, the holder block 34 being retractively moved, according to arrow 46, by the head 27 of this newly formed sleeve blank 47.

In addition to the foregoing extrusion, as caused by the tool 36 and which is in an endwise direction outwardly, the fixed back-up pin 32 causes an extrusion of the opposite end of the shank 28 in an inward direction to form a collar-like extrusion 48 around said back-up pin that is limited by the knockout sleeve 33. An integral bridge 49 is thus formed in the sleeve blank 47, the same being inwardly spaced from the end of the blank that is remote from the head 27.

It will be understood that the extrusion action occurs instantaneously and while the shank 28 is under pressures and heat generated by the tool 36 from one end and the pin 32 from the opposite end. Since the tool body 39 displaces no metal from the head 27 and the lands 40 displace but small portions of said head, due to the taper of seat 29, the head is but little affected by the extrusion process, only the shank elongating to the tubular slitted form of FIG. 4. It will be noted that no metal is removed from the pre-formed blank 15a during its conversion to the form 47, as in FIG. 4.

*Further pre-heading and passage unblocking*

The means shown in FIGS. 6 and 7 are used for carrying out this step of the present sleeve-producing method. The blank 47, after removal from the die block 30, is placed with its tubular shank 45 in the bore 50 of a die block 51. A back-up pin 52 fits within the collar 48 of the shank 45 and bottoms against the integral bridge 49. The pin 52 is fixed, but the die block 51 is spring-biased in the direction of arrow 53. The end face 54 of the die block, concentric with the bore 50, is provided with an annular groove 55.

A forming block 56 has a bore 57 that is axially aligned with the die bore 50 and a pre-forming seat 58 in the end directed toward the die surface 54. A pin 59 is axially disposed in the bore 57 and extends from the end of the block 56, the same slidingly fitting the passage 43 of a sleeve blank 47 in the die block 51.

After the blank 47 has been placed in the die block 51, the forming block 56 is moved toward the block 51 until the head 27 of said blank bottoms on the seat 58. At this time, the end of the block 56 is spaced away from the face 54 of the die block. Now, the pin 59 is projected into contact with the bridge 49, the blank 47, thereby, being firmly held between the pins 52 and 59, as shown in FIG. 6.

Continued movement of block 56 causes the die block 51, which is spring-biased toward the block 56, to be moved in the direction of the arrow 64. Of course, the blank 47 moves with the die block relative to the two fixed pins 52 and 59. As a consequence, the bridge 49 is sheared from the sleeve shank 45, as shown in FIG. 7, but remains in the sleeve passage 43 after the block 56 and pin 59 have been retracted so the newly formed sleeve blank 65 may be removed from the die bore 50.

Now, the block 56 is moved according to arrow 60 to cause the end of said block to close against the surface 54 of the die block, thereby further pre-forming the head 27 to its new form, as in FIG. 7, while causing the groove 55 to form an annular ridge 61 in the back face of said head, and the constricting portions 62 of seat 58 to contract the head at its forward end to form a collar 63 that is approximately the same diametral size as the tubular shank 45. As can be seen in FIG. 7, this contraction of the head eliminates the tapered seat 29 and closes off the slits 40 at the head end of the blank.

*Passage unblocking and final forming*

FIGS. 8 and 9 show means for performing the final production step of the method. The blank 65, after removal from the die block 51, is placed with its tubular and slitted shank 45 in the bore 66 of a spring-biased die block 67 with the annular ridge 61 of the head 27 fitted into an annular groove 68 provided therefor in the face 69 of the die block. A knock-out sleeve 70 operates in said bore 66 and a fixed back-up pin 71 resides in the passage of said sleeve.

A head-forming punch 72 has a bore 73 that is axially aligned with the axis of bore 66 and is opened out at 74 to a larger size to serve as a discharge. A seat 75 in the end of punch 72 has the final-finish form that is to be given to the head 27, said seat having an annular recess 76 into which the collar 63 of the pre-formed blank 65 extends, when said blank is in operative position in the die bore 66.

The end of pin 71 will hold the sheared bridge 49 immovable while the sleeve shank 45 moves to the position of FIG. 9. In this manner, said bridge 49 is displaced from the passage 43 of the sleeve and into the bore 73 of the punch where the same remains until displaced by successive bridges of subsequent sleeves 79 into the discharge opening 74 in the punch. Upon movement of the punch 72 in the direction of the arrow 77, the same will first encounter the sleeve head 27, as in FIG. 8, then will reform the head from the shape shown in FIG. 8 to its final shape, as in FIG. 9 and, then, by abutting against the face 69 of the die block 67, pressing said block in the direction of the arrow 78, the finally-formed sleeve 79 in the bore of said block moving with the block relative to the fixed back-up pin 71.

As can best be seen in FIG. 10, the annular ridge 61 defines a groove 80 for a compression washer 81 that is slid over the sleeve shank 45 after the same has been removed, by means of knock-out sleeve 70, from the die block 67.

FIGS. 10, 11 and 12 show the manner of providing the sleeve 79, as above produced, with a pin 82 for clinching said sleeve to effect connection of members 83 or any other member or members.

As shown in FIG. 10, the shank 84 of pin 82 is passed through the pin passage 43 so that the gripping end 85 thereof extends beyond the collar 63 of the sleeve head 27. A head 86 on the end of the shank 84 opposite to the end 85 has abutting engagement with the end of the sleeve shank 45, and annular ridges 87 in shank 84 adjacent the head 86, have an interfering fit in passage 43 to effect a tight fit between the sleeve 79 and the pin 82 beyond where the slots 44 in the sleeve shank 45 terminate. Break-away or shear grooves 88 are provided in the pin shank 84 at an intermediate portion where said grooves would be aligned with the collar 63 when the sleeve is clinched.

The above-described lock rivet is applied to clinch members 83 in the usual way by passing the head 86 through openings 89 in said members, tightly pressing the head 27 with its compression washer 81 against said members while pulling on the gripping end 85 of the pin 82 with a suitable tool. Such a pull will cause the arcuate sections of the slitted shank to collapse by folding outwardly to form the collapsed portions 45a that clinch against the side of the members 83 opposite to the side engaged with the head 27.

In the clinched condition of the rivet, one of the grooves 88 will be aligned with the collar 63 which is contracted by the rivet-clinching tool into such a groove or grooves. This stops endwise clinching movement of the pin. However, the pull is continued, continuously or in an intermittent manner, on the pin end 85 until break-away attenuation at one of said grooves 88 occurs. This condition is shown in FIG. 12, which is the clinched or locked condition of the rivet.

While the foregoing discloses what is now contemplated to be the best mode of carrying out the invention, the same is, of course, subject to modification without departing from the spirit and scope of the invention. Therefore, it is not desired to restrict the invention to the particular method steps or combination or sequence of method steps described, but to cover all equivalent steps or methods that may fall within the scope of the appended claims.

Having thus described this invention, what is claimed and desired to be secured by Letters Patent is:

1. A method for forming a sleeve for a lock rivet from a cylindrical blank that consists in
    (a) forming a pre-head on one end of said blank by upsetting said end to a larger size than the blank while simultaneously forming a flared end socket in said pre-head and foreshortening said blank accordingly,
    (b) subjecting the headed blank from the head end thereof to longitudinal extrusion forces to form a blind cylindrical passage in the blank and to simultaneously form a set of longitudinal slits in the tubular wall around said passage by dividing said wall by extrusion into arcuate portions,
    (c) simultaneously subjecting the opposite end of the blank to longitudinal extrusion in a direction toward the pre-head thereof to form a blind cylindrical depression with a tubular wall around said depression and to leave and integral bridge portion in the blank between the blind ends of said passage and depression,
    (d) separating said bridge from the tubular wall by shearing the same from the blank and displacing it from said opposite end of the blank along the axis of the blank while contacting a portion of the head to close the ends of the slits in the head and form a collar extension on the end of the head, and finally,
    (e) swaging the head to its final shape while removing the sheared bridge from the passage.

2. A method according to claim 1 in which the step of removing the sheared bridge moves the blank and bridge in opposite directions with the bridge leaving the passage in the blank at the head end thereof.

3. In a method for forming a sleeve for a lock rivet from a solid cylindrical blank,
    (a) the step of forming by extrusion a blind axial passage in one end of said blank while simultaneously by extrusion forming a set of longitudinal slits through the wall in said blank to divide said wall into arcuate portions,
    (b) the portions of the blank extruded to form the passage and the slits in the wall being added to said arcuate portions during such extrusion to increase the length thereof accordingly.

4. In a method for forming a sleeve for a lock rivet from a solid cylindrical blank,
    (a) the step of forming by extrusion a blind axial passage in one end of said blank while simultaneously by extrusion forming a set of longitudinal slits through the wall in said blank to divide said wall into arcuate portions,
    (b) the portions of the blank extruded to form the passage and the slits in the wall being added to said arcuate portions during such extrusion to increase the length thereof accordingly,
    (c) the simultaneous step of forming, by extrusion, a blind cylindrical depression in the opposite end of the blank with a collar therearound that is a tubular elongation of the blank.

5. In a method according to claim 4, the step of shearing the portion of the blank between the blind ends of said blind passage and depression.

6. In a method according to claim 5, the step of displacing the sheared portion from one end of the passage.

7. In a method according to claim 5, the step of displacing the sheared portion from one end of the passage, and the simultaneous step of closing the slits at the one end of said blank.

8. A method for producing from a solid cylindrical blank of metal a headed sleeve having a set of longitudinal slits, closed at both ends thereof to provide said sleeve with portions adapted to fold in an outward direction by opposite forces applied to the ends of said sleeve, said method consisting in
    (a) forming a recessed head on one end of the blank by upsetting the blank metal and foreshortening the blank accordingly,
    (b) forcing an extruding tool into the socket in said head while confining the latter to extrude the blank to form a close-ended sleeve extension having said head on the open end thereof, while simultaneously dividing the wall of said extension by longitudinal extrusions into a set of longitudinal arcuate portions separated by longitudinal slits open at the head end of the blank, and
    (c) thereafter closing the open ends of the slits while contracting the head.

9. A method for producing from a solid cylindrical blank of metal a headed sleeve having a set of longitudinal slits, closed at both ends thereof to provide said sleeve with portions adapted to fold in an outward direction by opposite forces applied to the ends of said sleeve, said method consisting in
    (a) forming a recessed head on one end of the blank by upsetting the blank metal and foreshortening the blank accordingly,
    (b) forcing an extruding tool into the socket in said head while confining the latter to extrude the blank to form a close-ended sleeve extension having said head on the open end thereof, while simultaneously dividing the wall of said extension by longitudinal extrusions into a set of longitudinal arcuate portions separated by longitudinal slits open at the head end of the blank,
    (c) thereafter closing the open ends of the slits while contracting the head, and,
    (d) finally, removing the closed end of the blank by shearing it from the sleeve and displacing the same through the head end of the sleeve.

10. A method for producing a sleeve for a lock rivet out of a solid round blank of malleable metal, said method consisting in
    (a) placing said blank in a die block with one end thereof extending from said block,
    (b) upsetting said extending end to form a head on the blank with a flared end socket in said head,
    (c) forcing an extruding tool into the socket in said head while confining the latter to extrude the blank to form a close-ended sleeve extension having said head on the open end thereof,
    (d) simultaneously dividing the wall of said extension into a set of longitudinal arcuate portions separated by longitudinal slits open at the head end of the blank, (e) simultaneously with the forming of the sleeve extension and of the arcuate portions thereof, forcing a second extruding tool from the opposite end of the die block into the opposite end of the blank, to form an extruded collar on the blank at the latter end thereof to leave an integral bridge in the blank between the opposed blind ends of the sleeve and collar extensions, (f) separating the bridge from the blank by shearing and displacing the same along the axis of the sleeve extension, (g) simultaneously contracting a portion of the head to close the ends of the slits in the head and form a collar extension on the end of the head, and, finally, (h) swaging the head to its final shape while removing the sheared bridge from the sleeve and out of the head at the end thereof.

References Cited in the file of this patent

UNITED STATES PATENTS

| | | |
|---|---|---|
| 1,819,254 | Mantle | Aug. 18, 1931 |
| 2,361,770 | Huck | Oct. 31, 1944 |
| 2,385,831 | Mullgardt | Oct. 2, 1945 |
| 2,586,336 | Huck | Feb. 19, 1952 |
| 3,055,255 | Burrell | Sept. 25, 1962 |
| 3,065,661 | Kolec et al. | Nov. 27, 1962 |